(No Model.) 5 Sheets—Sheet 3.

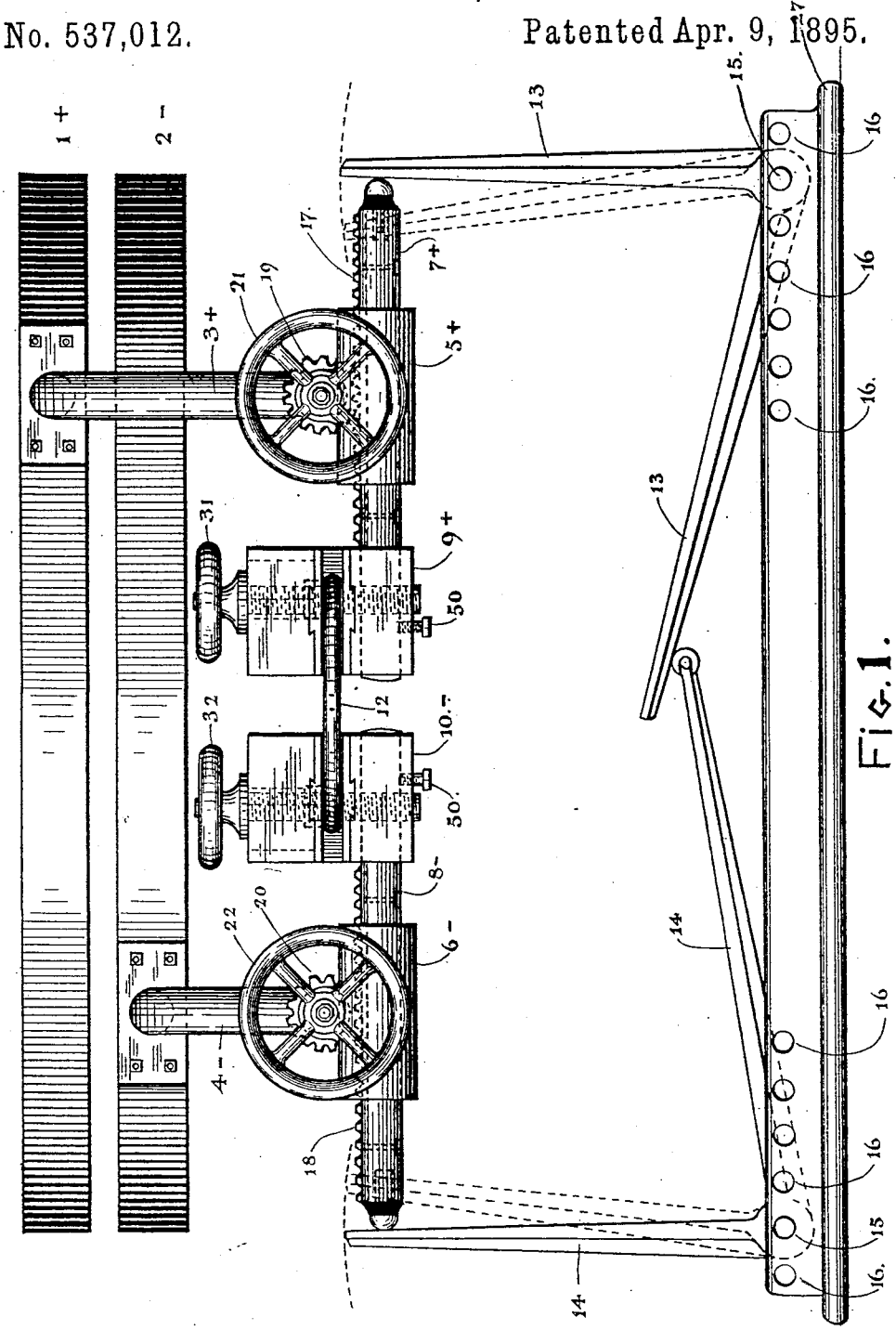

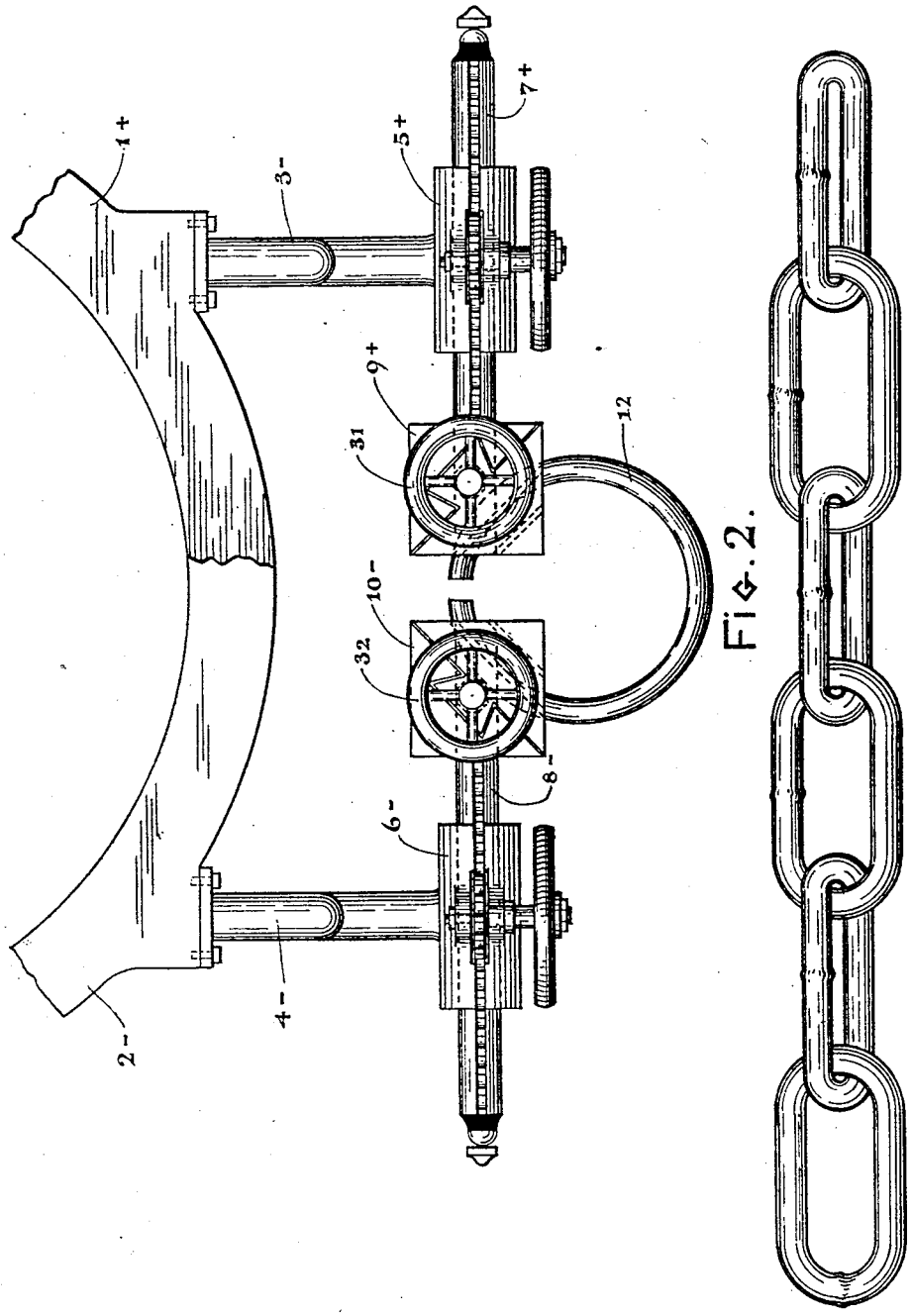

G. D. BURTON & E. E. ANGELL.
ELECTRICAL WELDING APPARATUS.

No. 537,012. Patented Apr. 9, 1895.

WITNESSES  INVENTORS (No Model.) 5 Sheets—Sheet 4.

G. D. BURTON & E. E. ANGELL.
ELECTRICAL WELDING APPARATUS.

No. 537,012. Patented Apr. 9, 1895.

(No Model.) 5 Sheets—Sheet 5.

G. D. BURTON & E. E. ANGELL.
ELECTRICAL WELDING APPARATUS.

No. 537,012. Patented Apr. 9, 1895.

WITNESSES

INVENTORS ns
UNITED STATES PATENT OFFICE.

GEORGE D. BURTON, OF BOSTON, AND EDWIN E. ANGELL, OF SOMERVILLE, MASSACHUSETTS, ASSIGNORS, BY MESNE ASSIGNMENTS, TO SAID BURTON.

ELECTRICAL WELDING APPARATUS.

SPECIFICATION forming part of Letters Patent No. 537,012, dated April 9, 1895.

Application filed March 3, 1893. Serial No. 464,607. (No model.)

*To all whom it may concern:*

Be it known that we, GEORGE D. BURTON, of Boston, in the county of Suffolk, and EDWIN E. ANGELL, of Somerville, in the county of Middlesex, State of Massachusetts, have invented a new and useful improvement in Electrical Welding Apparatus, of which the following is a specification.

The object of this invention is to provide a simple and convenient apparatus for electric welding, which can be manipulated rapidly and with facility.

Figures 5, 6:
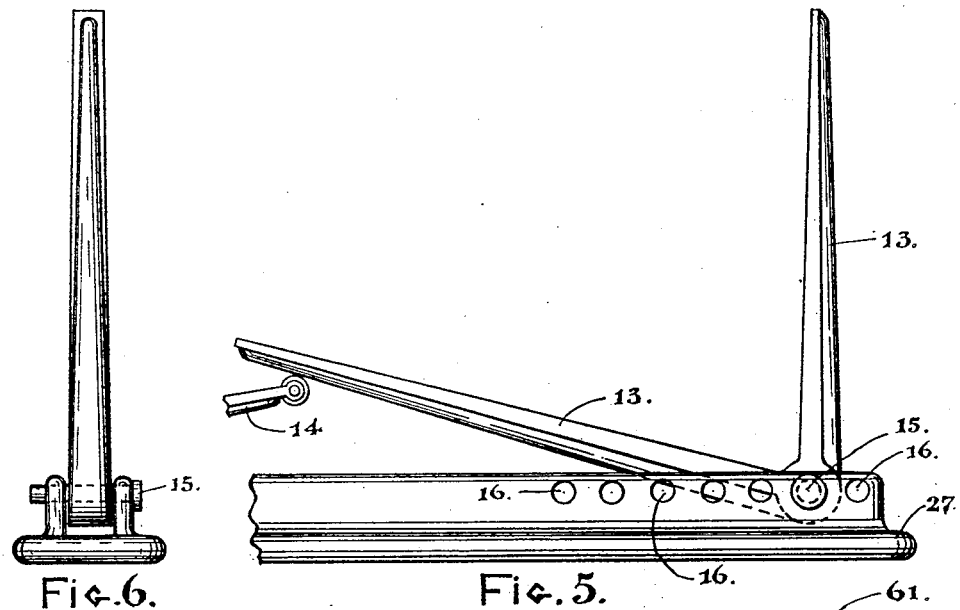
Figure 4:
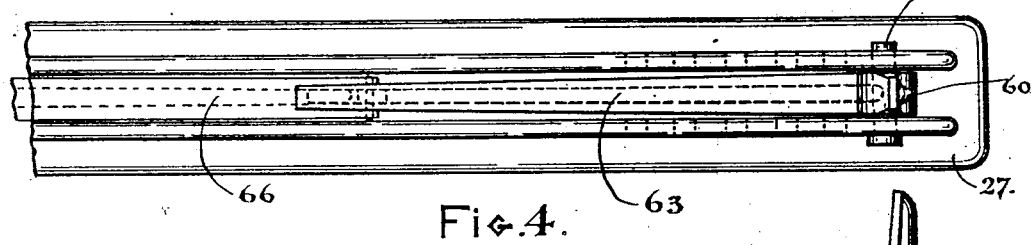
Figure 3:
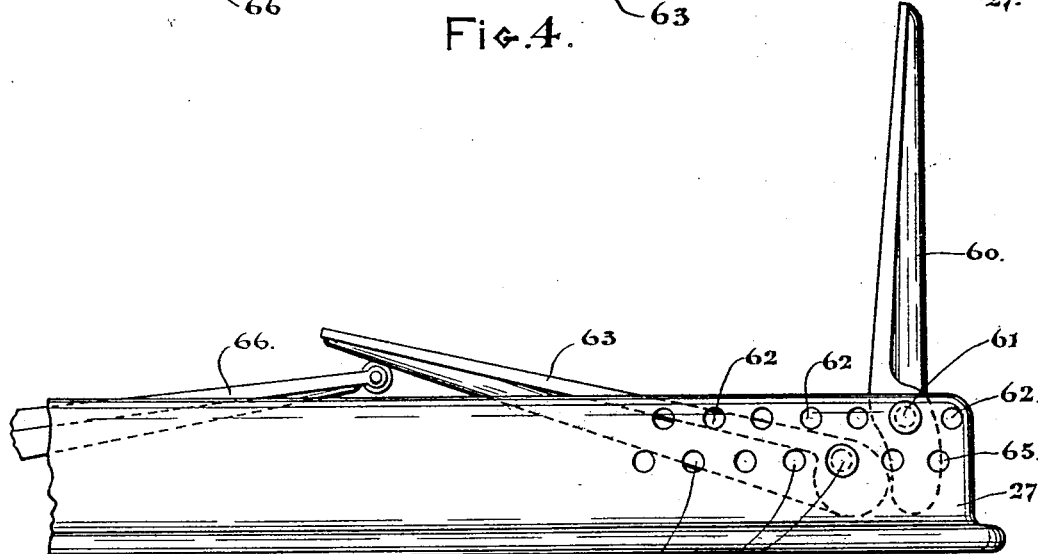
Figure 7:
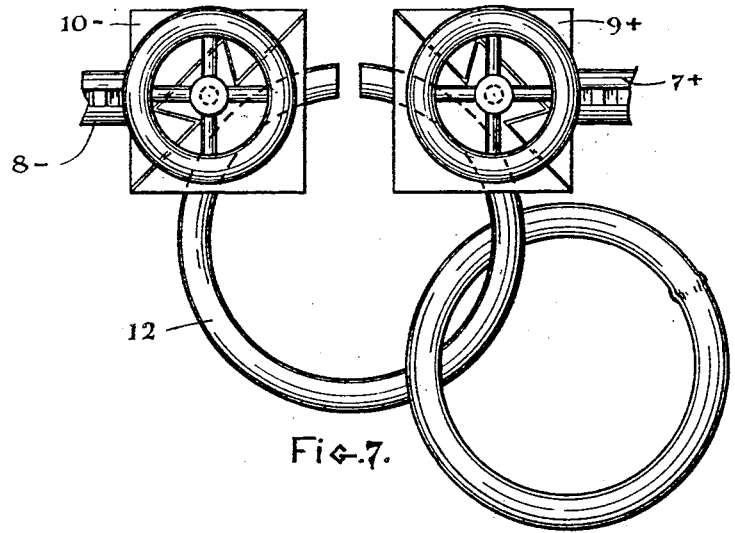
Figure 8:
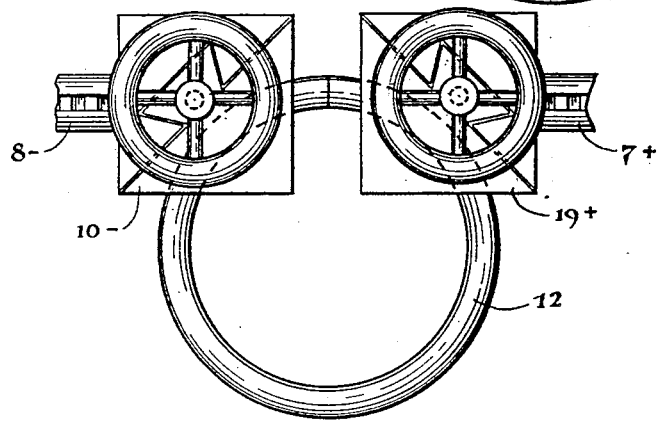
Figure 9:
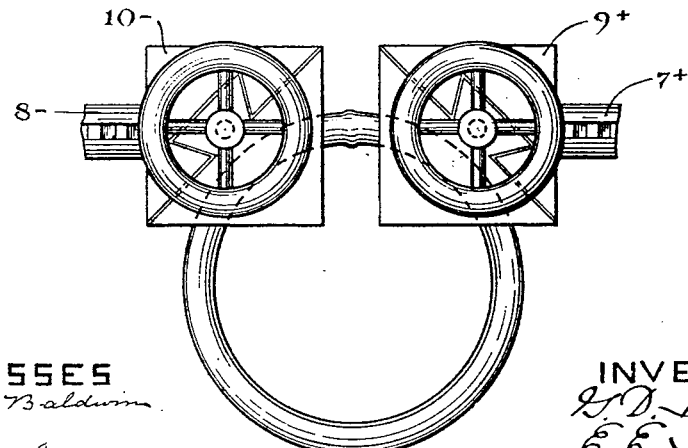
Figure 15:
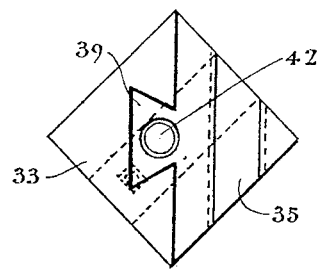
Figure 16:
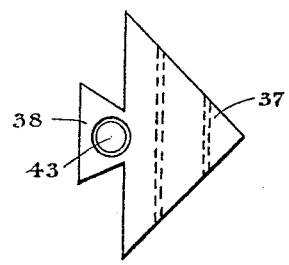
Figure 17:
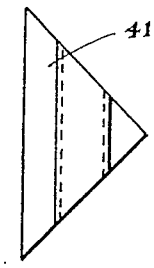
Figure 18:
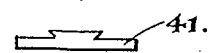
Figure 11:
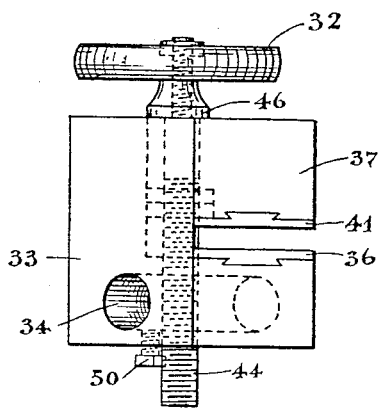
Figure 12:
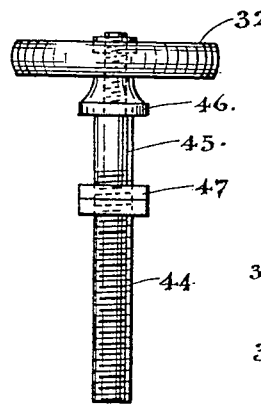
Figure 10:
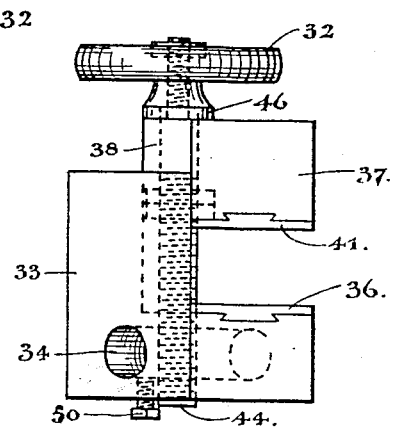

In the drawings:—Figure 1 is a side elevation of a portion of the converter with its electrical clamps and welding devices attached thereto. Fig. 2 is a top plan view of the same. Fig. 3 is a side elevation of a modification of the levers for working the apparatus. Fig. 4 is a top plan view of the same. Fig. 5 is an enlarged detail elevation of a portion of the levers shown in Fig. 1. Fig. 6 is an end view of the same. Figs. 7, 8, and 9 are top plan views of a portion of the apparatus, showing the clamps and the position of the metal in the several movements to effect the welding operation. Fig. 10 is a side elevation of one of the clamps removed, showing its parts enlarged in detail with the clamps open. Fig. 11 is a similar view with the clamps closed. Fig. 12 is a side elevation of the screw and its runners, which carries the top clamp with it. Figs. 13, 14, 15, 16, 17, 18, 19 and 20 are detail elevations and plan views of various portions of the clamping apparatus. Fig. 21 is a perspective view of a chain completed by the welding process.

The rings 1+ and 2− are such as form part of an electrical converter for converting currents of high tension into low tension, substantially as shown and described in the patent to Burton, Eddy and Briggs, No. 475,232, granted May 17, 1892, and the other parts of said converter are omitted in this application as they are well understood and are fully shown and described in said Letters Patent.

The arms 3+, 4−, attached to the rings convey the electric current to the sleeves, 5+, 6−, wh'  're arranged to carry the clamping apparatus of the bars, 7+, 8−, as is well understood. These bars, 7+, 8−, slide longitudinally in the sleeves and carry on their adjacent ends the clamps, 9+, 10−, which hold the ring-shaped piece of metal, 12, which is to be welded.

The bar 7+ has a rack, 17, on its upper side, and bar 8− has a similar rack, 18. A pinion, 19, mounted in bearings on sleeve, 5+, engages with the rack, 17, and is moved independently when desired by the hand wheel, 21, while a similar pinion, 20, mounted in like manner on sleeve 6− engages with rack, 18, and is capable of independent movement by the hand wheel 22. This allows of the clamps first being adjusted independently to the proper distance and position to hold ring, 12, when open as shown in Fig. 2, for beginning the process of heating.

Beneath the sleeves 5+, 6−, is fastened to the floor of the room a bed-plate, 27, which is slotted in its upper edge to receive the levers, 13, 14, which are bell-crank shaped, having their upright portions or arms bearing against the ends of the sliding bars, 7+, 8−, and which have their horizontal portions lapping past each other. One of the levers, 14, is provided at the end of its horizontal portion with a friction roller, where it comes against the arm of lever 13. By placing the foot on top of the overlapping part of lever, 13, and pressing downward the upright parts of the bell-crank levers will be moved toward each other and will slide the rods, 7+, 8−, and the clamps which they carry toward each other, so as to bring the separate ends of ring, 12, together at the proper instant, The process of electric welding by this apparatus is as follows: The ring 12 is first inserted between the clamps in the position shown in Figs. 2 and 7, with the ends separated, and the heating current is passed through the ring until the portion of it connecting the clamps electrically is raised to a high red heat. The clamps are then moved toward each other by the pressure of the foot on levers 13 and 14, bringing the ends of the ring together, in the position shown in Fig. 8, and the pressure is continued until the weld is formed by the current of electricity passing through the abutting ends, as shown in Fig. 9.

The heating of the main portion of the ring extending between the clamps to a red heat preparatory to heating the ends to be abutted facilitates the heating of said ends and prevents crystallization. When the ends are abutted and the current passed through them they are readily heated to a white heat by the current itself and by conduction of heat from the main body of the ring which has previously been heated. After the ends are welded, the entire ring cools off uniformly and the crystallization which usually takes place just back of the joint when the ends are welded without previous heating of the body of the ring, is avoided.

When the ring has been welded as shown in Fig. 9, it is also in a properly heated state to be hammered or formed into the elongated links, shown in chain, 21, before it has cooled, if so desired. In order to form the chain each ring or link is successively placed within the one to be welded, as shown in Fig. 7, before the welding operation takes place.

We are aware that various machines have heretofore been adopted for welding the abutting ends of rings or links, but in no instance has the machine used been of sufficient capacity to heat the portion of the ring or link connecting the clamps of the converter, in the manner described by us before the welding operation takes place, so far as we know, or if the machine has had that capacity the heating of the other parts of the link or ring has been carried on simultaneously with the welding of the joint, which fails to bring the other parts of it up to the requisite heat to accomplish the results which we aim to attain.

Figure 13:
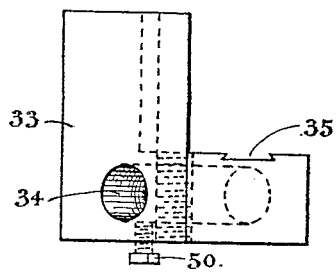
Figure 19:
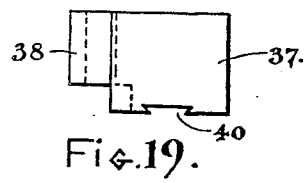
Figure 20:
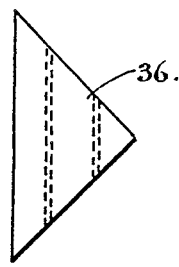
Figure 14:

The clamps 9+, 10—, are operated by hand wheels, 31, 32, and we will now proceed to describe their construction and mode of operation. The main portion of the clamp is shown in Fig. 13, and is the L-shaped piece of metal, 33, provided with the hole, 34, to fit onto the sliding bar, 8—. In the upper face of the horizontal portion is a dovetailed groove, 35, which is made to receive the corresponding dovetail of the lower face of plate, 36, (Fig. 14.) This plate is formed of copper or similar soft metal, to grasp the ring and prevent its being marred or injured while held in the clamp. The sliding part of the clamp is formed of the block, 37, (Figs. 16, 19) which is provided with a dovetail projection, 38, fitting into the corresponding vertical dovetail groove, 39, in the upright portion of block 33. The lower face of block, 37, has a similar dovetail groove, 40, in it into which the dovetail projection on the upper face of plate, 41, fits when the plate is slid into place in block 37. Plate 41 is also formed of soft metal to prevent injury to the ring to be welded, and the ring is grasped between plates 41 and 36.

A vertical hole, 42, is made in block 35 and provided with a screw thread. A corresponding hole, 43, in block 37 is made without a screw thread. The hand wheel, 32, is attached to a screw, 44, which has a smooth portion, 45, near its upper end below the collar, 46, which revolves in the hole 43 in block 37. Check nuts, 47, are attached to the screw in a recess on the lower side of block 37, so that the latter is securely held between the shoulder 46 and collar 47 and carried with the screw up and down as the latter revolves. The block, 37, being attached to the screw in this manner, the lower end of the latter is entered into the screw-threaded hole, 42, in block 33, the dovetail part, 38, of block 37 being also entered into the dovetailed groove, 39, in block 33. The screw is then run down and the block 37 may be made to assume the position shown in Figs. 10 and 11, and by turning the hand wheel 32 may be made to clamp the ring or other object between plates 36 and 41, which form jaws for that purpose.

The plates 36 and 41 may be formed of metal or material which creates a resistance where it comes in contact with ring, 12, sufficient to heat the ring between the jaws of the clamp to substantially the same extent as in the other parts of it between the clamps, thus insuring even heating of the ring substantially through all its parts, and by changing the plates 36 and 41 a greater or less degree of heat may be communicated to the parts between the clamps by the electric currents.

In order to permit of the adjustment of the bell crank levers, 13, 14, in the bed plate, 27, to accommodate the different distances at which the clamps, 9+, 10—, are desired to be set apart, a series of holes, 16, 16, are provided in the bed-plate extending horizontally through both sides of its slotted portion at different distances apart, into which the pivot, 15, of the crank levers may be shifted to accommodate it to the different positions of the bars, 7+, 8—. The clamps 9+, 10— are held upon these bars by set screws, 50, 50, and these also allow of their being adjusted at different positions on the bars, if so desired.

By providing for simultaneous movement of the clamps toward each other by means of the bell crank levers, 13, 14, the danger of bending the ring out of shape in the welding process is avoided, which might occur if one clamp were stationary and the other only moved toward it, but when this is not important either hand wheel, 21, or 22, may be used to bring the ends of the ring together to effect the welding. The bell-crank levers have the advantage, however, of working almost instantaneously in performing this operation, which is of considerable importance where it is desired to effect the welding without injuring the metal, as the quicker the weld can be effected after the ring is heated to the desired point, the less danger there is of injury to the metal in doing it.

A modification of the bell crank levers is shown in Figs. 3 and 4. An upright lever, 60, is pivoted in the bed plate, 27, by the pivot, 61, in one of the series of holes, 62, 62. The lower end of this lever projects downward into the slot in the bed-plate below its pivot, where it comes in contact with the cam ped end of lever, 63, which is pivoted by pivot 64 in one of the holes, 65, at the proper distance from the lever 60. The lever 63 overlaps the corresponding lever, 66, pivoted in like manner at the other end of the bed plate, as will be readily understood. By pressing down upon levers 63 and 66, levers 60 will be brought against the ends of the sliding bars which carry the clamps in the same manner as before described.

What we claim as new and of our invention is—

1. The combination of the clamp 9+, the sliding bar 7+ carrying said clamp and attached to one terminal of the converter, the clamp 10—, the sliding bar 8— carrying said clamp and attached to the other terminal of the converter, and the bell crank levers, 13 and 14, arranged to have their upright arms bear upon said sliding bars, respectively, and move the same toward each other by pressure exerted upon the horizontal arms of said levers, substantially as described.

2. The combination of the clamp 9+, the sliding bar 7+ carrying said clamp and attached to one terminal of the converter, the clamp 10—, the sliding bar 8— carrying said clamp and attached to the other terminal of the converter, and the bell crank levers, 13, 14, mounted upon pivots made adjustable with relation to each other and arranged to have their upright arms bear upon said sliding bars, respectively, and move the same toward each other by pressure exerted upon the horizontal arms of said levers, substantially as described.

GEO. D. BURTON.
EDWIN E. ANGELL.

Witnesses:
CHAS. F. ADAMS,
H. H. RIDEOUT.